(12) United States Patent
Hosking (10) Patent No.: US 8,861,972 B2
(45) Date of Patent: Oct. 14, 2014

(54) COMBINATION NETWORK FIBER CONNECTOR AND LIGHT PIPE

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 1642 days.

(21) Appl. No.: 12/200,337

(22) Filed: Aug. 28, 2008

(65) Prior Publication Data

US 2010/0054749 A1    Mar. 4, 2010

(51) Int. Cl.
*H04B 10/00* (2013.01)
*H04B 10/40* (2013.01)
*H04B 10/12* (2006.01)

(52) U.S. Cl.
CPC ..................... *H04B 10/40* (2013.01)
USPC .......................... 398/138; 398/135

(58) Field of Classification Search
USPC ................................. 398/135–139
See application file for complete search history.

(56) References Cited

U.S. PATENT DOCUMENTS

| | | | |
|---|---|---|---|
| 5,812,572 A | 9/1998 | King et al. | |
| 6,141,125 A | 10/2000 | Blair et al. | |
| 6,692,132 B1 * | 2/2004 | Meeker | 362/26 |
| 6,975,395 B1 | 12/2005 | Gentieu et al. | |
| 7,072,587 B2 | 7/2006 | Dietz et al. | |
| 7,215,891 B1 | 5/2007 | Chiang et al. | |
| 7,268,688 B2 | 9/2007 | Juds | |
| 7,286,736 B2 | 10/2007 | Rosenberg | |
| 7,320,551 B1 * | 1/2008 | Moore et al. | 385/92 |
| 7,426,348 B2 | 9/2008 | Mahowald et al. | |
| 7,507,111 B2 | 3/2009 | Togami et al. | |
| 7,630,631 B2 | 12/2009 | Aronson et al. | |
| 7,721,012 B2 | 5/2010 | Le et al. | |
| 7,757,936 B2 | 7/2010 | Aguren et al. | |
| 8,135,282 B2 | 3/2012 | Hosking | |
| 2002/0149821 A1 * | 10/2002 | Aronson et al. | 359/152 |
| 2003/0020986 A1 | 1/2003 | Pang et al. | |
| 2003/0053170 A1 | 3/2003 | Levinson et al. | |
| 2003/0057984 A1 | 3/2003 | Akram | |
| 2003/0163508 A1 | 8/2003 | Goodman | |
| 2003/0231839 A1 | 12/2003 | Chen et al. | |
| 2004/0071471 A1 | 4/2004 | Baker et al. | |
| 2004/0213286 A1 * | 10/2004 | Jette et al. | 370/466 |
| 2005/0032415 A1 * | 2/2005 | Sakamoto | 439/490 |
| 2005/0079831 A1 | 4/2005 | Ramachandran | |
| 2005/0105915 A1 | 5/2005 | Light | |

(Continued)

OTHER PUBLICATIONS

U.S. Appl. No. 12/184,042, May 3, 2011, Office Action.

(Continued)

*Primary Examiner* — Daniel Dobson
(74) *Attorney, Agent, or Firm* — Maschoff Brennan (57) ABSTRACT

Exemplary embodiments of the invention relate to an optical transceiver in which the base portion is made of a light permeable material and configured to emit light representative of the status of certain transceiver parameters. The transceiver includes a housing which at least partially encloses the base portion. The base portion connects to a printed circuit board on which a light-emitting diode is mounted. Light from the light-emitting diode is conducted to front portion of the base, which is light permeable, through a light-pipe assembly, thereby illuminating the entire front portion of the base. Because the front portion of the base is not enclosed within the housing the light emitted is clearly visible from a distance even when fiber connectors are plugged into the transceiver receptacles.

20 Claims, 5 Drawing Sheets

(56) References Cited

U.S. PATENT DOCUMENTS

| | | |
|---|---|---|
| 2005/0196111 A1 | 9/2005 | Burdick et al. |
| 2005/0196322 A1 | 9/2005 | Truex |
| 2005/0238305 A1* | 10/2005 | Miller et al. .................. 385/123 |
| 2006/0062116 A1 | 3/2006 | Ishibashi |
| 2006/0093379 A1* | 5/2006 | Aronson ....................... 398/208 |
| 2006/0189220 A1 | 8/2006 | Duval et al. |
| 2007/0058980 A1 | 3/2007 | Hidaka |
| 2007/0058987 A1 | 3/2007 | Suzuki |
| 2007/0092257 A1 | 4/2007 | Smith et al. |
| 2007/0291491 A1* | 12/2007 | Li et al. ........................ 362/307 |
| 2009/0261955 A1 | 10/2009 | Moore et al. |
| 2010/0027991 A1 | 2/2010 | Hosking |
| 2010/0028015 A1 | 2/2010 | Hosking |
| 2010/0054733 A1 | 3/2010 | Hosking |
| 2010/0054734 A1 | 3/2010 | Hosking |

OTHER PUBLICATIONS

U.S. Appl. No. 12/184,042, Aug. 22, 2011, Office Action.
U.S. Appl. No. 12/184,042, Jan. 19, 2012, Notice of Allowance.
U.S. Appl. No. 12/184,093, Apr. 19, 2011, Office Action.
U.S. Appl. No. 12/184,093, Sep. 13, 2011, Office Action.
U.S. Appl. No. 12/184,093, Nov. 3, 2011, Notice of Allowance.
U.S. Appl. No. 12/184,101, May 3, 2011, Office Action.
U.S. Appl. No. 12/184,101, Mar. 14, 2012, Office Action.
U.S. Appl. No. 12/184,101, Apr. 16, 2012, Notice of Allowance.
U.S. Appl. No. 12/200,398, May 26, 2011, Office Action.
U.S. Appl. No. 12/200,398, Feb. 1, 2012, Office Action.
U.S. Appl. No. 12/200,406, Jun. 29, 2011, Office Action.
U.S. Appl. No. 12/200,406, Dec. 1, 2011, Office Action.

\* cited by examiner

COMBINATION NETWORK FIBER CONNECTOR AND LIGHT PIPE

BACKGROUND OF THE INVENTION

1. The Field of the Invention

The present invention relates generally to optoelectronic communication devices. More specifically, the present invention relates to an optical transceiver in which the front portion of the transceiver module emits light representative of the module's operational status.

2. The Relevant Technology

Computing and networking technology have transformed our world. As the amount of information communicated over networks has increased, high-speed transmission has become ever more critical. Many high-speed data transmission networks rely on optical transceivers and similar devices for facilitating transmission and reception of digital data embodied in the form of optical signals over optical fibers. Optical networks are thus found in a wide variety of high-speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include an electro-optic transducer driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller"), which is the focus here, controls the operation of the laser driver and post amplifier.

In general, the operational status of a particular transceiver module is not ascertainable from a visual inspection. Some conventional network interfaces have light emitting diodes (LEDs) or other light sources that provide a visual status indicator of the activity of a link associated with the network interface. However, the use of such LEDs in optical transceivers has been limited by various factors, including cost, the positioning of visual indicators on the face plate or active end of the transceivers, and compliance with industry standards. Additionally, due in part to Multi Source Agreement (MSA) requirements, the available surface area in which to mount an LED status indicator on a transceiver module is extremely limited.

Furthermore, as optical communication networks become more popular, the number of transceiver modules in contained a particular area. The increased density of transceiver modules contained in a single rack makes it difficult for an end user to navigate through the fiber optic cables to see a tiny LED on the surface of a particular module. In an area housing an entire wall of transceivers, ascertaining the status of a single LED on a particular module can be both cumbersome and time consuming.

It is therefore difficult for network administrators to determine the status of an individual link and to troubleshoot complex systems. An optical transceiver capable of displaying status information in a meaningful way while operating within a host would be advantageous.

BRIEF SUMMARY OF THE INVENTION

These and other limitations are overcome by embodiments of the invention which relate to an optical transceiver module in which the transmission status of the module is visually indicated on the base portion of the transceiver in real time.

Exemplary embodiments of the invention relate to an optical transceiver in which the base portion or a part of the base portion is made of a light permeable material and configured to emit light representative of the status of certain transceiver parameters or representative of other parameters or factors. The transceiver includes a housing which at least partially encloses the base portion. The base portion connects to a printed circuit board on which a light-emitting diode is mounted. Light from the light-emitting diode is conducted to front portion of the base, which is light permeable, through a light-pipe assembly, thereby illuminating the entire front portion of the base. Because the front portion of the base is not enclosed within the housing 110 the light emitted is clearly visible from a distance even when fiber connectors are plugged into the transceiver receptacles.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter. Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 1:
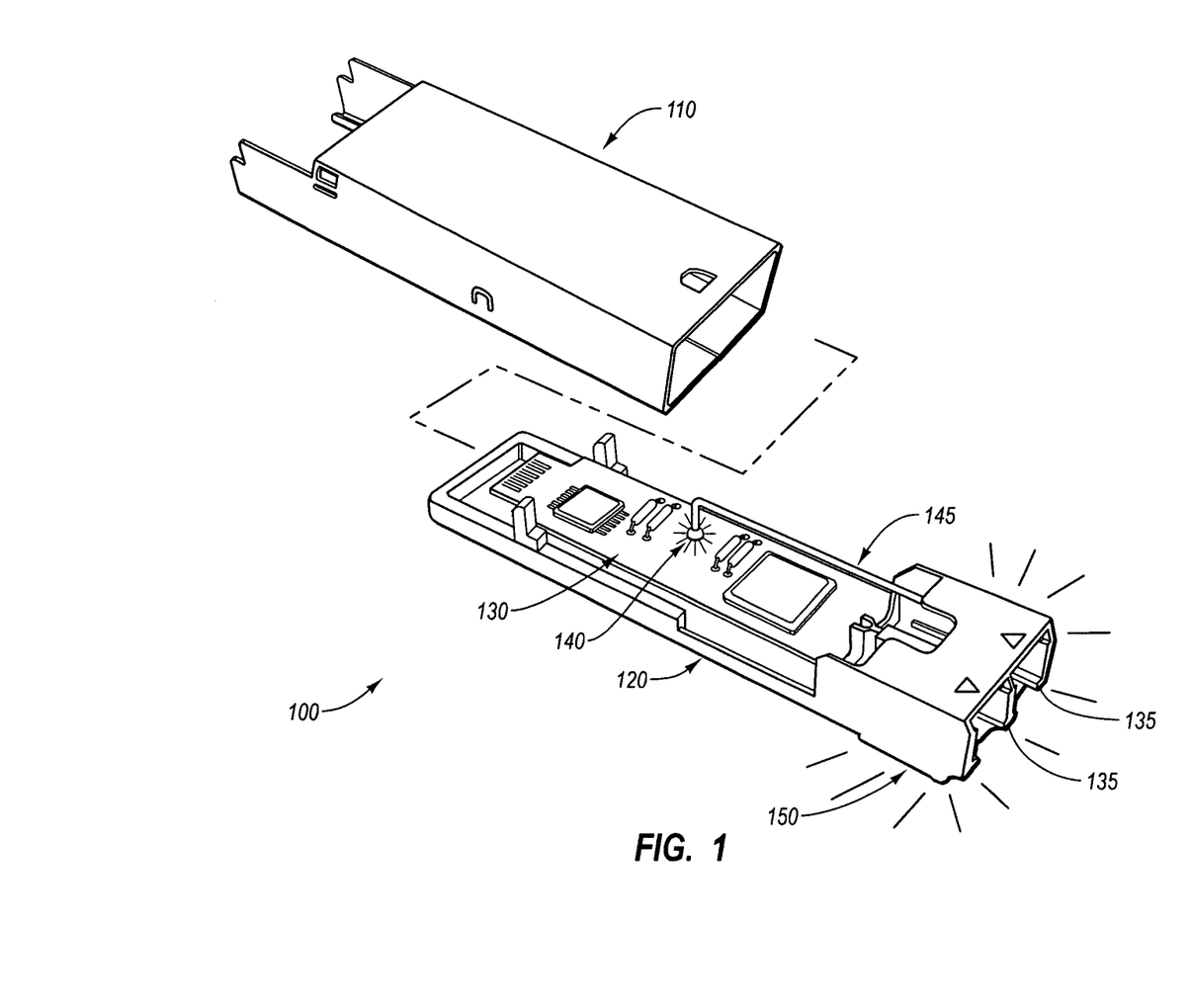
FIG. 1 illustrates a system diagram example of an optical transceiver that may implement features of the present invention.

FIG. 1 discloses various aspects of an embodiment of an optical transceiver 100 in which the base portion 120 is made of a light permeable material and configured to emit light representative of the status of certain transceiver parameters. The transceiver 100 includes a housing 110 which at least partially encloses the base portion 120. The base portion 120 connects to a printed circuit board 130 on which a light-emitting diode 140 is mounted. Light from the light-emitting diode 140 is conducted to front portion 150 of the base 120, which is light permeable, through a light-pipe assembly 145, thereby illuminating the entire front portion 150 of the base 120. Because the front portion 150 of the base 120 is not enclosed within the housing 110, the light emitted is clearly visible from a distance even when fiber connectors are plugged into the transceiver receptacles 135.

An example operational optical transceiver environment will first be described. Then, the operation in accordance with the invention will be described with respect to the operational environment.

While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G, 40 G, 100 G, and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

Figure 2:
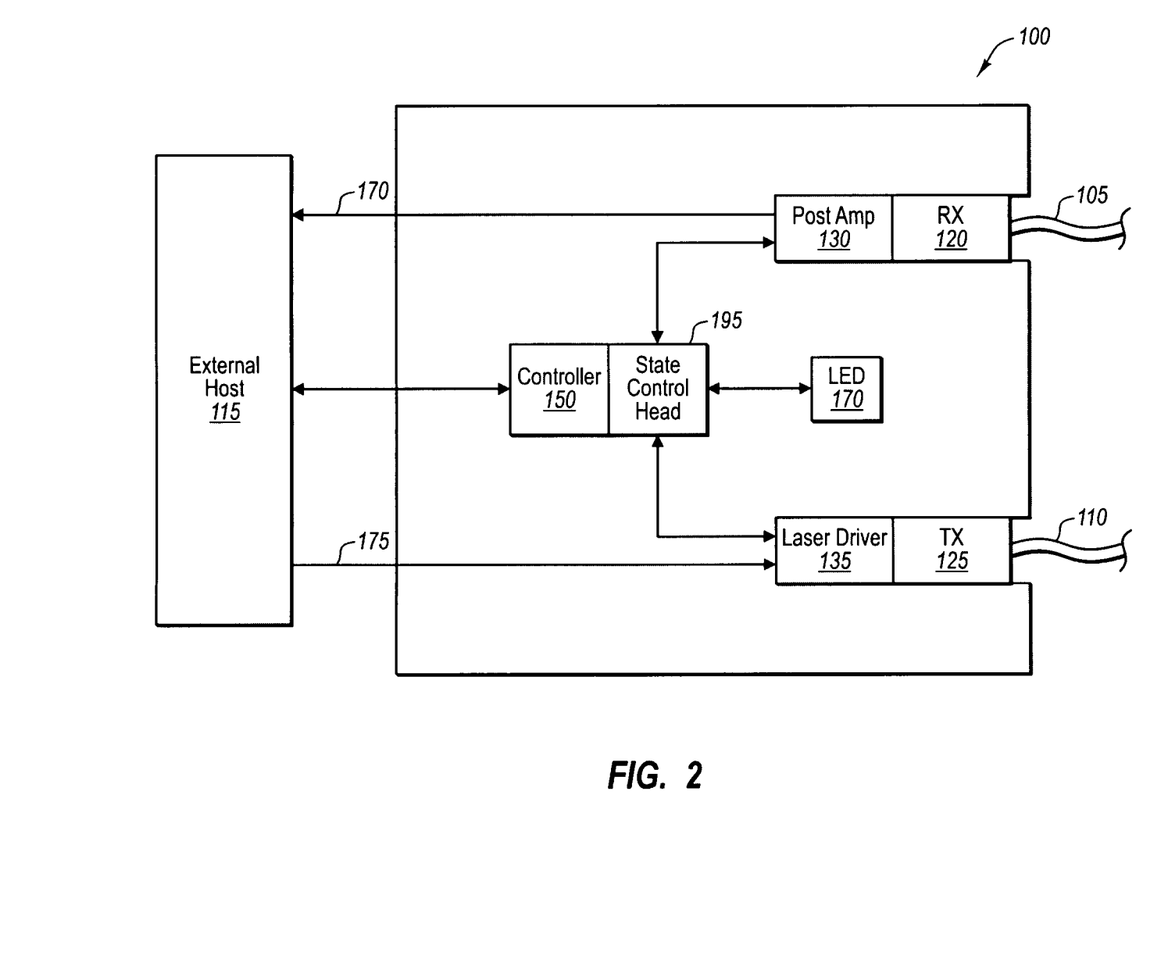
FIG. 2 is a block diagram that illustrates the transceiver module of FIG. 1 in further detail.

As shown in FIG. 2, the optical transceiver 100 receives an optical signal from fiber 105 using receiver 120. The receiver 120 acts as an opto-electric transducer by transforming the optical signal into an electrical signal. The receiver 120 provides the resulting electrical signal to a post-amplifier 130. The post-amplifier 130 amplifies the signal and provides the amplified signal to an external host computing system represented by arrow 170. The external host 115 may be any computing system capable of communicating with the optical transceiver 100.

The optical transceiver 100 may also receive electrical signals from the host 115 for transmission onto the fiber 110. Specifically, the laser driver 135 receives an electrical signal from host 115 as represented by the arrow 175, and drives the transmitter 125 (e.g., a laser or LED) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. To ensure the quality and integrity of data transmission, various measurement and compensation circuits may be employed to compensate for these changes. The measurement and compensation circuits are managed by the control module of the transceiver, hereinafter "controller" 150.

The controller 150 collects and evaluates diagnostic data, such as, but not limited to, temperature, voltage, and low frequency changes (such as receive power) from the post-amplifier 130 (as represented by arrow 180) and/or from the laser driver 135 (as represented by arrow 185). In evaluating operation conditions, the controller 150 receives analog measurements from several sensors, converts the analog signal to a digital value, performs comparison logic with the digital values and predetermined setup data, and, finally, stores the digital operating condition values and the results of the comparison logic (collectively "digital diagnostic data") in the controller's 150 non-volatile memory. This allows the controller 150 to optimize the dynamically varying performance, and additionally detect when there is a loss of signal. Specifically, the controller 150 may counteract these changes by adjusting settings on the post-amplifier 130 and/or the laser driver 135 as also represented by the arrows 180 and 185.

The controller 150 is accessed by the status control module 195 which is configured to manage the operation of the status indication assembly 155. Based on parameters values from the controller 150, the status control module 195 changes the color of the LED 170 representing a particular operational parameter. Several color combinations may be used to indicate different operational states of the transceiver. Bicolor LEDs contain 2 dies of different colors connected back to back, and can produce any of 3 colors. Current flow in one direction produces one color, current in the other direction produces the other color, and bidirectional current produces both colors mixed together. Tricolor LEDs contain 2 dies of different colors with a 3 wire connection, available in common anode or common cathode configurations. The most common form of both the bicolor and tricolor LEDs is red/green, producing orange when both colors are powered. RGB LEDs contain red, green and blue emitters, generally using a 4 wire connection with one common (anode or cathode).

Figure 3A:
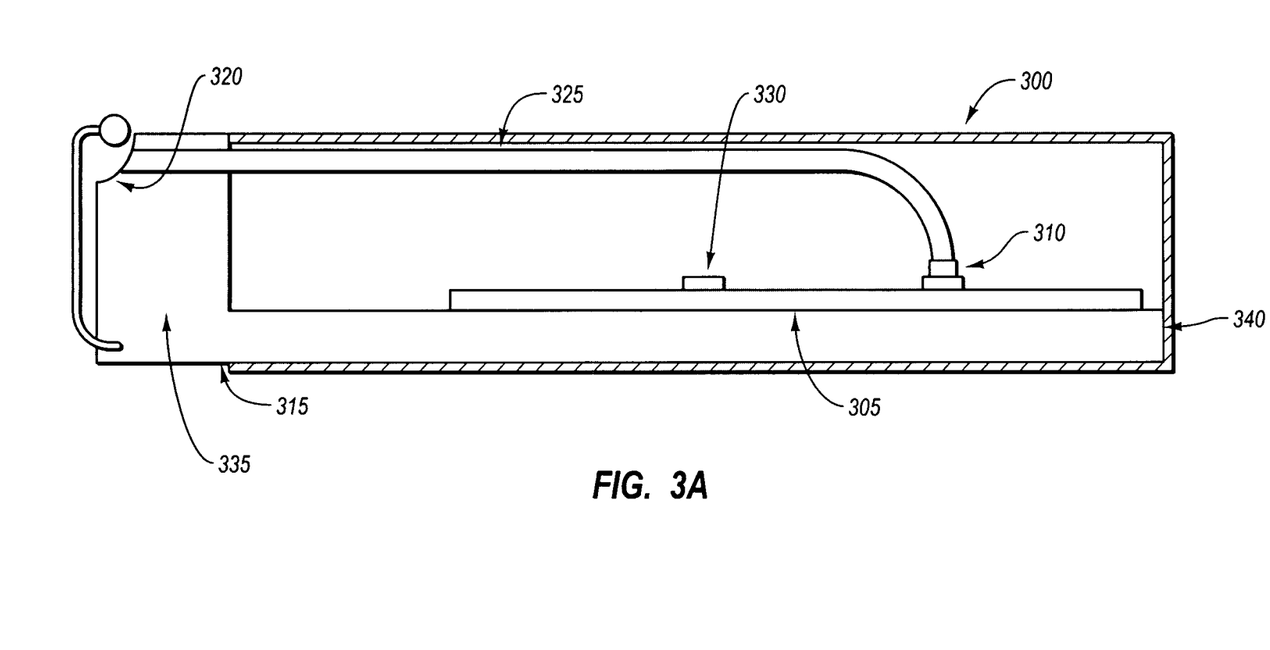
FIG. 3A illustrates a side view of an example of an optical transceiver that may implement features of the present invention.
Figure 3B:
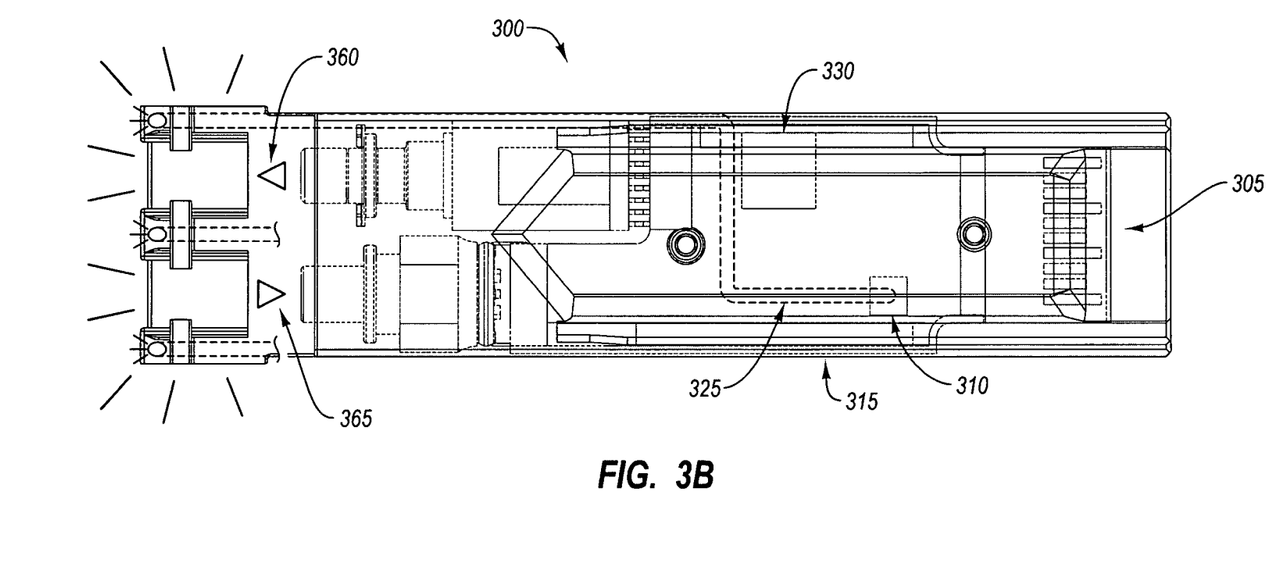
FIG. 3B illustrates a top view of an example of an optical transceiver that may implement features of the present invention.

Referring to FIGS. 3A and 3B, embodiments of the invention relate to an optical transceiver module 300 having a light permeable base portion, wherein the light permeable base portion emits light representative of transceiver operational parameters. Embodiments of the invention involve mounting the LED 310 the printed circuit board 305 of transceiver 300 such that it is electrically connected to the controller 330. The controller 330 is configured to manage the color of light that the LED 310 emits based on the particular parameter value that the LED 310 represents. In this embodiment, light from the LED 310 is conducted to the face of the transceiver module 300 by means of a light pipe assembly 325. The light pipe assembly 325 extends to the front portion 335 of the base 340.

Because the front portion 335 of the base is made of a light permeable material, light conducted through the light-pipe 325 from the LED 310 is emitted as the illuminated front portion 335 of the base 340. As the controller 330 detects a change in value of the parameter represented by the LED 310, the controller 310 drives the LED 310 to emit a different color representing the new value of the parameter.

While the particular embodiment of FIGS. 3A and 3B employs a light pipe assembly to the conduct light from the LED to the face of the transceiver, the light from the LED may be conducted by means of fibers, molded plastic light pipes, or any reflective, refractive, or conductive channel. Using a light conduction means as opposed to mounting LEDs directly on the visible surface of the transceiver allow the LED to be mounted anywhere on the printed circuit board of the transceiver, thereby the eliminating tricky mounting and wiring issues that would be encountered in directly mounting the LEDs on the limited surface area available on the face of the transceiver. Additionally, by conducting light from the printed circuit board, the viewing position and viewing angle of the indicator is more easily achieved. Finally, clever indicator forms, such as illuminating the "Input" and "Output" fiber connector arrows can be created on the base. By making the surface of the base portion slightly opaque with completely transparent arrows, the direction of optical transmission can be represented. Best illustrated in FIG. 3B, the transmit indicator 360 is represented as an outgoing arrow and the receive indicator 365 is represented as an incoming arrow.

Alternatively, the light pipe assembly is not required to conduct light to the front portion of the face when the LED 310 is located proximate to the front portion 335 of the base 340 as shown in FIG. 3C. In this embodiment, the LED 310 is located adjacent to the light permeable front portion 335 of the base and communicates with the controller 330 via an electrical connection 345 to the printed circuit board 305. Thereby, obviating the need for the light pipe assembly. Light from the LED 310 is directly emitted through the light permeable front portion 335 of the base.

Figures 4A, 4B, 5A, 5B:
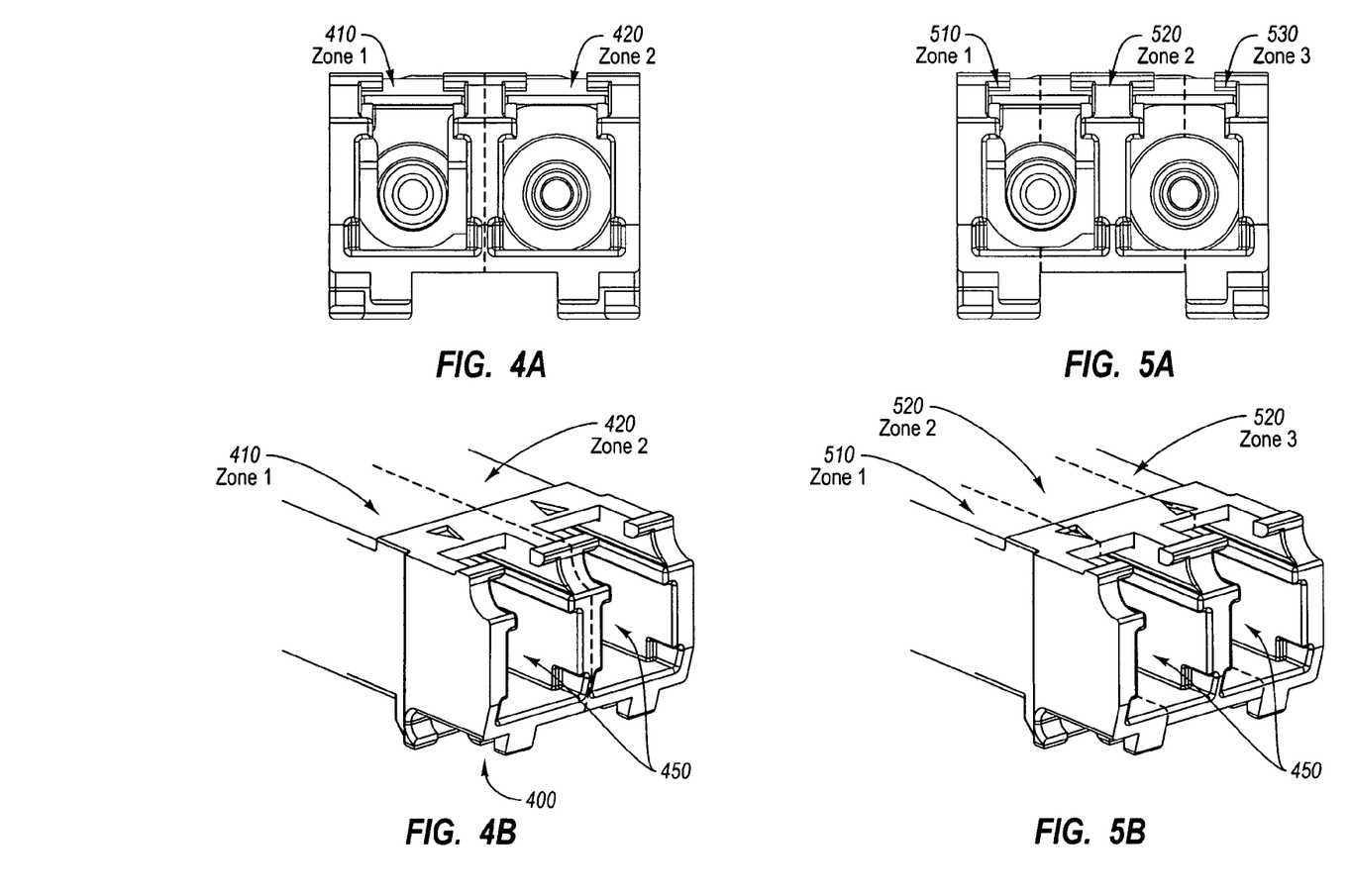
FIG. 4A illustrates the front view of an example embodiment of an optical transceiver having two zones that may implement features of the present invention.
FIG. 4B illustrates the front view of an example embodiment of an optical transceiver having two zones that may implement features of the present invention.
FIG. 5A illustrates the front view of an example embodiment of an optical transceiver having two zones that may implement features of the present invention.
FIG. 5B illustrates the front view of an example embodiment of an optical transceiver having two zones that may implement features of the present invention.

The number of operational parameters that may be represented at one time may be increased by dividing the visible portion of the base into different zones. As shown in FIGS. 4A and 4B, the front portion of the transceiver 400 may be divided into two separate zones with each zone representing a different operational parameter. In this embodiment, each zone is driven by a different multi-colored LED. Therefore, the left zone 410 may be a different color than the right zone 420 depending on the values of the operational parameters represented.

For example, in the embodiment of FIGS. 4A and 4B, the left zone 410 may represent the TxDisable/TxFault operational parameter and the right zone 420 may represent the RxLOS operational parameter according to the operational states of Table 1.

TABLE 1

| SIGNAL | ZONE COLOR | INDICATION |
| --- | --- | --- |
| TxDisable/TxFault | Green | Transmitter is enabled and no transmitter error detected. The outbound optical link is operational. |
| | Yellow | Transmitter is disabled by host. |
| | Red | Transmitter fault detected. The outbound optical link is not operational. |

TABLE 1-continued

| SIGNAL | ZONE COLOR | INDICATION |
| --- | --- | --- |
| RxLOS | Green | Received optical signal strength is good. |
| | Yellow | Received optical signal strength is marginal. |
| | Red | No incoming optical signal. |

Similarly, in the three-zone configuration of FIGS. 5A and 5B, the TxDisable indicator 510, TxFault indicator 220, and RxLOS indicator 530 are each illuminated by a different multi-color LED, and may represent different operational states according to Table 2. Notably, in both configurations, the status indicators are visually ascertainable when fiber connector cables are plugged into the transceiver receptacles 450.

TABLE 2

| SIGNAL | ZONE COLOR | INDICATION |
| --- | --- | --- |
| TxDisable | Green | Transmitter is enabled by host. |
| | Yellow or Red | Transmitter is disabled by host. |
| TxFault | Green | No transmitter error detected. |
| | Yellow | Transmitter warning condition detected. Outbound optical signal quality may be degraded. |
| | Red | Fault detected. Transmitter is not operational. |
| RxLOS | Green | Received optical signal strength is good. |
| | Yellow | Received optical signal strength is marginal. |
| | Red | No incoming optical signal. |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transceiver module comprising:
   a base having an electrical connector at a first end that is capable of interfacing with a host device and having a transmit receptacle and a receive receptacle at a second end that are each capable of physically receiving a corresponding cable connector, wherein substantially all of a visible surface area surrounding the transmit receptacle and the receive receptacle of the second end is light permeable;
   a printed circuit board coupled to the base;
   a transmitter optical subassembly communicatively coupled to the printed circuit board for transmitting high-speed data;
   a receiver optical subassembly communicatively coupled to the printed circuit board for receiving high-speed data; and
   a light source electrically connected to the printed circuit board and configured to emit light through the light permeable second end of the base based on operational parameter values received from a controller.

2. The transceiver module of claim 1, further comprising a means for conducting light emitted from the light source to the light permeable second end of the base such that the light permeable second end of the base is illuminated with light from the light source.

3. The transceiver module of claim 2, wherein the means for conducting light emitted from the light source to the light permeable second end of the base is a light pipe assembly.

4. The transceiver module of claim 2, wherein the means for conducting light emitted from the light source to the light permeable second end of the base is an optical fiber with formed ends.

5. The transceiver module of claim 1, wherein the light source is a multi-colored light-emitting diode configured to emit a plurality of colors each representing an operational state.

6. The transceiver module of claim 1, further comprising a second light source configured to emit light through the light permeable second end of the base based on operational parameter values, wherein the light permeable second end of the base is divided into two zones each capable of representing an operational parameter value.

7. The transceiver module of claim 6, wherein the light permeable second end of the base is capable of representing TxDisable/TxFault and RXLOS.

8. The transceiver module of claim 6, further comprising a third light source configured to emit light through the light permeable second end of the base based on operational parameter values, wherein the light permeable second end of the base is divided into three zones each capable of representing an operational parameter value.

9. The transceiver module of claim 8, wherein the light permeable second end of the base is capable of representing TxDisable, TxFault, and RxLOS.

10. A transceiver module comprising:
a controller that monitors the transmission and reception of high-speed data, wherein the controller collects status describing the transmission and reception of the high-speed data;
a transmitter optical subassembly communicatively coupled to the controller for transmitting high-speed data;
a receiver optical subassembly communicatively coupled to the controller for receiving high-speed data;
a light source communicatively coupled to the controller, wherein the controller drives the light source based on the status of the transmission and reception of the high-speed data; and
a base having a transmit receptacle and a receive receptacle that are each capable of physically receiving a corresponding cable connector, wherein substantially all of a visible surface area surrounding the transmit receptacle and the receive receptacle of the base is partially translucent and capable of emitting light from the light source.

11. The transceiver module of claim 10, wherein the light source is a multicolored light-emitting diode configured to emit a plurality of colors each representing a status of the transmission and reception of the high-speed data.

12. The transceiver module of claim 11, further comprising a light pipe assembly for conducting light emitted from the light source to the base such that the base is illuminated with light from the light source.

13. The transceiver module of claim 11, further comprising an optical fiber with formed ends for conducting light emitted from the light source to the base such that the base is illuminated with light from the light source.

14. The transceiver module of claim 10, further comprising a second light source configured to emit light through the base based on the status of the transmission and reception of the high-speed data, wherein the base is divided into two zones each capable of representing a status value.

15. The transceiver module of claim 14, wherein the base is capable of representing TxDisable/TxFault and RxLOS.

16. The transceiver module of claim 14, further comprising a third light source configured to emit light through the base based on the status of the transmission and reception of the high-speed data, wherein the base is divided into three zones each capable of representing a status value.

17. The transceiver module of claim 16, wherein the base is capable of representing TxDisable, TxFault, and RxLOS.

18. A transceiver module comprising:
a base configured to be partially received within a host device, the base having an electrical connector at a first end that is capable of interfacing with the host device and having a transmit receptacle and a receive receptacle at a second end that are each capable of physically receiving a corresponding cable connector, the base also having an output arrow proximate the transmit receptacle and an input arrow proximate the receive receptacle that are each visible when the base is received within the host device, wherein the input and output arrows are light permeable;
a printed circuit board coupled to the base;
a transmitter optical subassembly communicatively coupled to the printed circuit board for transmitting high-speed data;
a receiver optical subassembly communicatively coupled to the printed circuit board for receiving high-speed data; and
one or more light sources electrically connected to the printed circuit board and configured to selectively emit light through the light permeable input arrow and output arrow.

19. The transceiver module of claim 18, wherein the selectively emitted light through the light permeable input arrow and output arrow represents the direction of optical transmission of the transceiver module.

20. The transceiver module of claim 18, wherein all of a visible surface area of the second end that is visible when the base is received within the host device, except for a surface area of the input arrow and the second arrow, is substantially light permeable.

* * * * *